Oct. 23, 1962 D. C. EISENDRATH ETAL 3,059,822
DECANTER AND POURING SPOUT
Filed Feb. 18, 1959
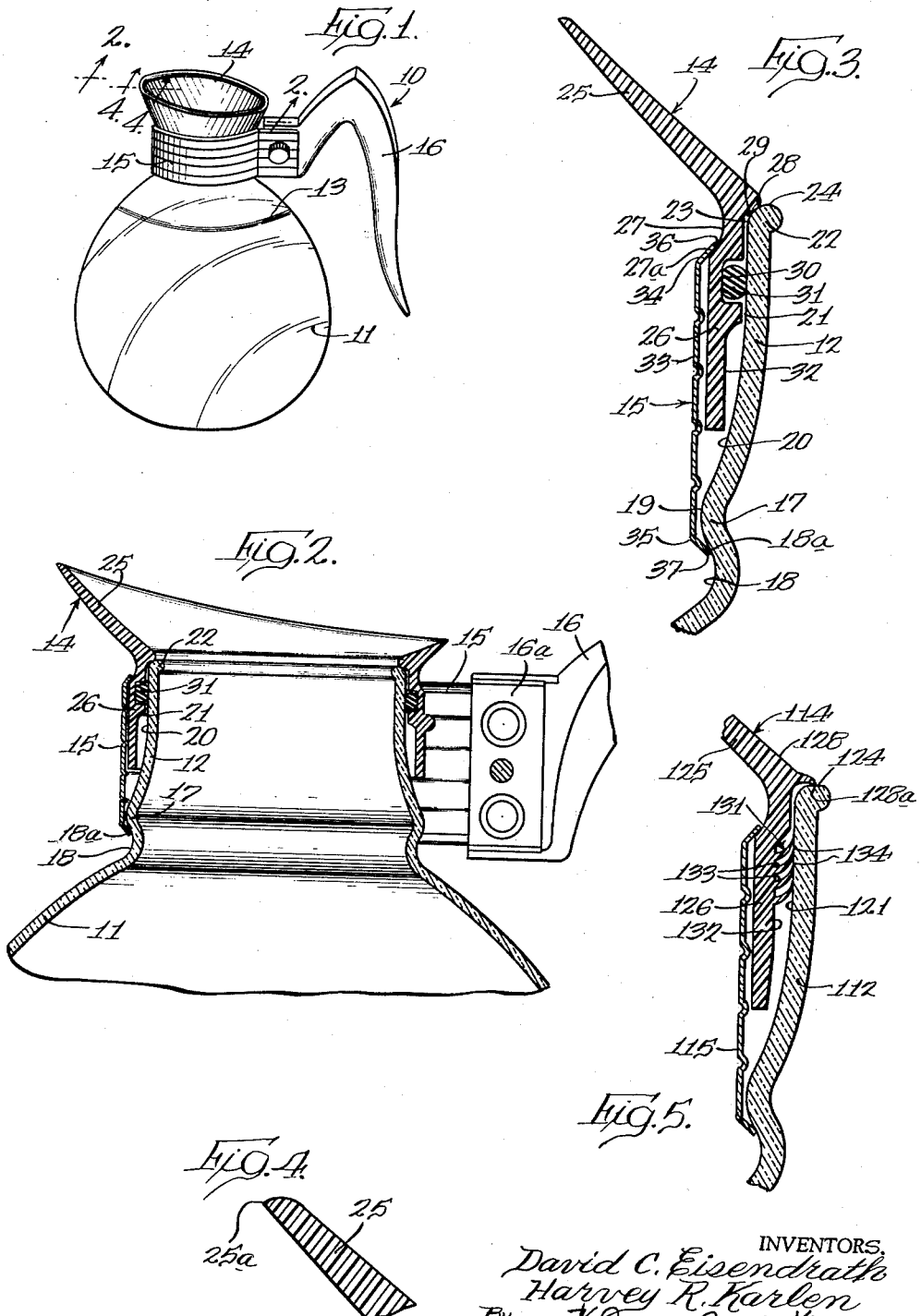
INVENTORS.
David C. Eisendrath
Harvey R. Karlen United States Patent Office 3,059,822
Patented Oct. 23, 1962

3,059,822
DECANTER AND POURING SPOUT
David C. Eisendrath and Harvey R. Karlen, Chicago, Ill., assignors to Cory Corporation, a corporation of Delaware
Filed Feb. 18, 1959, Ser. No. 794,174
8 Claims. (Cl. 222—566)

This invention relates to a decanter and in particular to a decanter having a removable plastic spout.

A conventional form of decanter is one formed of heat resistant glass having an integral pouring spout and a handle secured thereto. Such a decanter has the serious disadvantage of susceptibility of the pouring spout to breakage. In an attempt to answer this problem, different types of removable spouts have been developed which are arranged to be placed over and protect the frangible integral spout of the decanter. While this has solved the problem of breakage, the known discharge spouts have introduced additional problems. One such problem is that it has been difficult to provide such a removable spout which will accommodate itself to the different out-of-round conditions found in different bowl neck structures, which out-of-round conditions are quite common. Not only are the bowl necks out-of-round, but also they tend to vary in their dimensions, further precluding the satisfactory use of known removable spouts. Another problem arising in the known removable spouts is that they are excessively rigid whereby they may deform or break other structures, such as glasses or cups, when inadvertently struck thereagainst. Another disadvantage in the known removable spouts is the difficulty of maintaining them completely sanitary while providing a structure which has a desirable esthetic effect. Further, certain of the known removable spouts have a tendency to affect the taste of the beverage as the beverage is passed over the spout. Still another disadvantage of known removable spouts is the failure thereof to have a proper seal with the bowl neck whereby the fluid may collect between the spout and the bowl neck and leak downwardly therefrom.

Applicants have developed and herein disclose and claim new and improved decanter means eliminating the above discussed problems and disadvantages in a simple and economical manner. The principal object of the invention, therefore, is to provide a new and improved removable spout decanter.

Another object of the invention is to provide a new and improved removable plastic spout decanter. The invention comprehends the provision of such a spout formed of a plastic, such as a polypropylene plastic, which is sufficiently deformable to accommodate itself to an out-of-round condition of the decanter bowl neck, and to a variation in the external dimensions of the bowl neck. The plastic spout is rigid enough to retain its shape, yet is sufficiently deformable to preclude denting of other structures when struck against the same. Further, the plastic spout material withstands temperatures in excess of 275° F. The spout material preferably has a high gloss imparting to the spout a desirable esthetic effect and facilitating the maintenance and cleaning thereof. The inert plastic material imparts no taste to the beverage as it comes in contact therewith.

Still another object of the invention is to provide such a removable spout decanter means having new and improved means for sealing the spout to the decanter bowl neck.

Still another object is to provide such a decanter means having new and improved annular sealing means longitudinally inwardly of the top edge of the decanter bowl neck.

A yet further object is to provide such a decanter means wherein a seal is effected between an annular portion of the spout and the top edge of the decanter bowl neck, new and improved means being provided for urging the spout downwardly over the neck to maintain said seal.

Other features and advantages of the invention will be apparent from the following description, taken in connection with the accompanying drawing wherein:

FIG. 1 is an isometric view of a decanter means embodying the invention;

FIG. 2 is an enlarged fragmentary, diametric section taken approximately along the line 2—2 of FIG. 1;

FIG. 3 is a still further enlarged, fragmentary section thereof;

FIG. 4 is a still further enlarged, fragmentary section of a tip portion of the spout as seen in FIG. 3; and FIG. 5 is a fragmentary section of a modified form of decanter means embodying the invention.

In the exemplary embodiment of the invention, as disclosed in FIGS. 1 through 4 of the drawing, a decanter generally designated 10 is shown to comprise a bowl 11 having an upstanding tubular neck 12 for passing liquid, such as beverage 13, relative to bowl 11. An annular spout 14 is removably secured to neck 12 by means of a clamp 15 to which is secured a suitable handle 16. Clamp 15 is arranged to have a new and improved coaction with neck 12 and spout 14 to retain the spout removably and sealingly on neck 12. Spout 14 is arranged to have a new and improved coaction with the clamp and with neck 12 to provide an improved dispensing of beverage 13 from the decanter.

More specifically, decanter bowl 11 may comprise a heat resistant glass bowl, such a conventional Pyrex bowl, suitable for preparation of beverages such as coffee or hot chocolate, therein. Neck 12 is generally tubular and is provided with a radially outwardly projecting annular enlargement 17 adjacent bowl 11. As best seen in FIG. 3, the outer surface of neck 12 adjacent enlargement 17 comprises a re-entrant annular surface 18 having a radius of curvature of approximately 3/16 inch, an outwardly projecting annular surface 19 having a radius of curvature of approximately 1/4 inch, and a re-entrant surface 20 narrowing from surface 19 to a generally cylindrical surface 21 extending to adjacent the longitudinally outer end 22 of neck 12. Outer end 22 is defined by a longitudinally inner frusto-conical surface 23 tapering inwardly at an angle of approximately 12° to the cylindrical surface 21, and a rounded longitudinally outwardly facing surface 24.

Spout 14 comprises a generally annular member formed of a plastic material such as a polypropylene plastic. Such a plastic spout permits it to be struck against other structures, such as glass drinking containers, without damage thereto; the temperature resistant characteristics of such a spout permit its use with temperatures in excess of 275° F.; the high gloss of the spout gives the spout a highly desirable appearance as well as facilitating maintenance and cleaning; and the inert characteristics of the spout preclude affecting the taste of the beverage as it is dispensed thereover.

Spout 14 comprises an outwardly flaring pouring portion 25 and a generally cylindrical securing portion 26. As best seen in FIG. 4, the outer tip 25a of the pouring portion is acute, thereby precluding undesirable running of the beverage back along the underside of the pouring portion during a pouring operation. Further, acute tip 25a tends to cut the flow of beverage sharply upon termination of the pouring operation, thereby preventing formation of drops of the beverage on the outer tip such as form on the rounded tips as found in the art and run down the outside of the spout subsequent to a pouring operation.

As best seen in FIG. 3, the radially outer surface of the spout between portions 25 and 26 comprises a re-entrant annular surface 27 having a radius of curvature of approximately 3/16 inch. The radially inner surface of the spout between portions 25 and 26 is defined by a longitudinally outer, radially inwardly projecting annular surface 28 having a radius of curvature of approximately .032 inch, and a longitudinally inner re-entrant annular surface 29 having a radius of curvature of approximately 1/16 inch maximum. Securing portion 26 is provided with a radially inwardly opening annular groove 30 spaced longitudinally inwardly from surface 29. A sealing means in the form of an O-ring 31 is disposed in groove 30. The cross sectional diameter of O-ring 31 is slightly greater than the depth of groove 30 whereby the O-ring projects from the groove into sealing engagement with cylindrical surface 21 of the decanter neck 12. The inner diameter of securing portion 26 is preferably slightly greater than the outer diameter of cylindrical surface 21 to provide clearance therebetween, and the longitudinally inner end of the securing portion is cut away at 32 to assure clearance with re-entrant surface 20 of the decanter neck. Thus, spout 14 may have contact with neck 12 only at the outer end 22 of the neck.

Clamp 15 comprises a split ring having a generally cylindrical mid-portion 33, an inturned longitudinally outer flange portion 34, and an inturned longitudinally inner flange portion 35. The free ends of the clamp ring are secured by suitable screw means 16a associated with handle 16. The tip 36 of outer flange 34 of the clamp ring engages the longitudinally inner portion 27a of annular surface 27 of the spout, and the tip 37 of the inner flange 35 engages the longitudinally outer portion 18a of the annular surface 18 of the bowl neck, when the clamp ring is constricted by the screw means 16a to secure the spout to the bowl neck.

To install spout 14 on decanter neck 12, the securing portion 26 of the spout, with O-ring 31 in groove 30, is first moved longitudinally inwardly over the outer end of the bowl neck 12 until surface 28 of the spout substantially abuts the outer surface 24 of the bowl neck. Clamp 15 is installed concentrically around the securing portion 26 of the spout and neck 12. Clamp 15 is then constricted by tightening screw means 16a, flange 35 thereof tending to slide downwardly along surface portion 18a of the bowl neck thereby urging the flanged end 34 of the clamp longitudinally inwardly against surface 27 of the spout and forcing the surface 28 of the spout against the surface 24 of the neck outer end. The spout is readily installed and removed relative to the bowl neck and readily accommodates itself to different bowl necks notwithstanding a variation in the dimensions and out-of-round characteristics thereof.

Referring now to FIG. 5, a modified spout 114 is shown to be generally similar to spout 14, but, in lieu of the groove 30 and O-ring 31, substantially the entire inner portion of the spout securing portion 126 is cut away at 132, and a plurality of inwardly extending annular ribs 131 is provided. Each of ribs 131 includes a thin annular base portion 133 terminating at the inner end thereof in a substantially linear circular tip 134. Each tip 134 has a substantially smaller diameter than the diameter of the confronting cylindrical surface 121 of the neck 112 whereby the ribs sealingly engage surface 121 to seal the spout 114 to the neck 112. Spout 114 further differs from spout 14 in that a thin, inwardly extending flange 128 is provided between the pouring portion 125 and the securing portion 126 of the spout. The inner portion of the flange comprises a longitudinally inwardly turned tip 128a which engages the longitudinally outwardly facing surface 124 of the decanter neck 112. Surface 124 is preferably smooth; surface irregularities, such as projections formed therein during molding, being removed as by grinding. Thus, a double seal between the spout and decanter neck is effected when the spout is drawn tightly onto the decanter neck by the clamp 115, one seal being provided between flange tip 128a and surface 124 and a second seal being provided between rib tips 134 and neck surface 121. In all other respects, spout 114 is substantially similar to spout 14.

While we have shown and described certain embodiments of our invention, it is to be understood that it is capable of many modifications. Changes, therefore, in the construction and arrangement may be made without departing from the spirit and scope of the invention as defined in the appended claims.

We claim:

1. A decanter comprising a container provided with a bowl and an upstanding neck for discharging liquid from the bowl as desired, said neck terminating in an annular outer end; a generally annular spout arranged to be removably associated with said neck for providing control of liquid during discharge from the container, said spout being formed of a substantially inelastic, flexible plastic deformable to accommodate the spout to said neck notwithstanding an out-of-round configuration of said neck, said spout having an annular portion abutting said neck outer end and a pouring portion extending longitudinally outwardly from said annular portion, and annular sealing means carried by said spout longitudinally inwardly of said outer end for sealing said spout to said neck, said sealing means being resiliently flexible to flexibly conform to said container and spout neck and resiliently seal the spout neck to the container neck.

2. The decanter of claim 1 wherein said annular means comprises a radially inwardly projecting rib on said spout sealingly engaging the neck outer end along its full annular extent notwithstanding irregularities in said end.

3. The decanter of claim 1 wherein said annular sealing means comprises a resilient ring.

4. The decanter of claim 3 wherein the spout is provided with a radially inwardly opening annular groove in which said ring is received to project therefrom into sealing engagement with said neck.

5. The decanter of claim 1 wherein said sealing means comprises at least one annular, radially inwardly projecting rib integrally on the spout, said rib having a thin base portion and an inner tip, the diameter of said tip of the rib being less than the outer diameter of the decanter neck to assure tight sealing engagement of the tip with the neck.

6. Decanter means comprising: a spout formed of a plastic material, said spout having a pouring lip end portion, an annular connecting portion, and means defining a radially inner shoulder adjacent said pouring lip end portion facing axially toward said connecting portion; and resiliently flexible annular sealing means carried by the connecting portion of the spout to extend coaxially therewithin, said sealing means extending radially inwardly from the connecting portion and adjacent said annular shoulder for sealing the spout to an annular surface such as that of a decanter neck.

7. Decanter means comprising: a decanter having an upper, annular pouring neck; a spout removably installed coaxially on said neck, said spout being formed of substantially unstretchable plastic material and having an upper pouring lip portion, an annular connecting portion including a radially inwardly opening groove confronting said neck, and an annular inturned flange overlying said neck for limiting the downward movement of the spout about said neck; and resilient annular sealing element including a portion received in said groove, said element extending radially inwardly from the connecting portion for sealing the spout to said neck.

8. The decanter means of claim 7 wherein said spout is formed of a homopolymeric plastic material.

References Cited in the file of this patent

UNITED STATES PATENTS

| | | |
|---|---|---|
| 351,876 | Marsh | Nov. 2, 1886 |
| 2,291,230 | Johnson | July 28, 1942 |
| 2,664,811 | Jepson | Jan. 5, 1954 |
| 2,678,142 | Creed | May 11, 1954 |
| 2,732,108 | Haddad | Jan. 24, 1956 |
| 2,807,944 | Glass | Oct. 1, 1957 |
| 2,885,949 | Curtis et al. | May 12, 1959 |
| 2,982,451 | Eisendrath | May 2, 1961 |